UNITED STATES PATENT OFFICE.

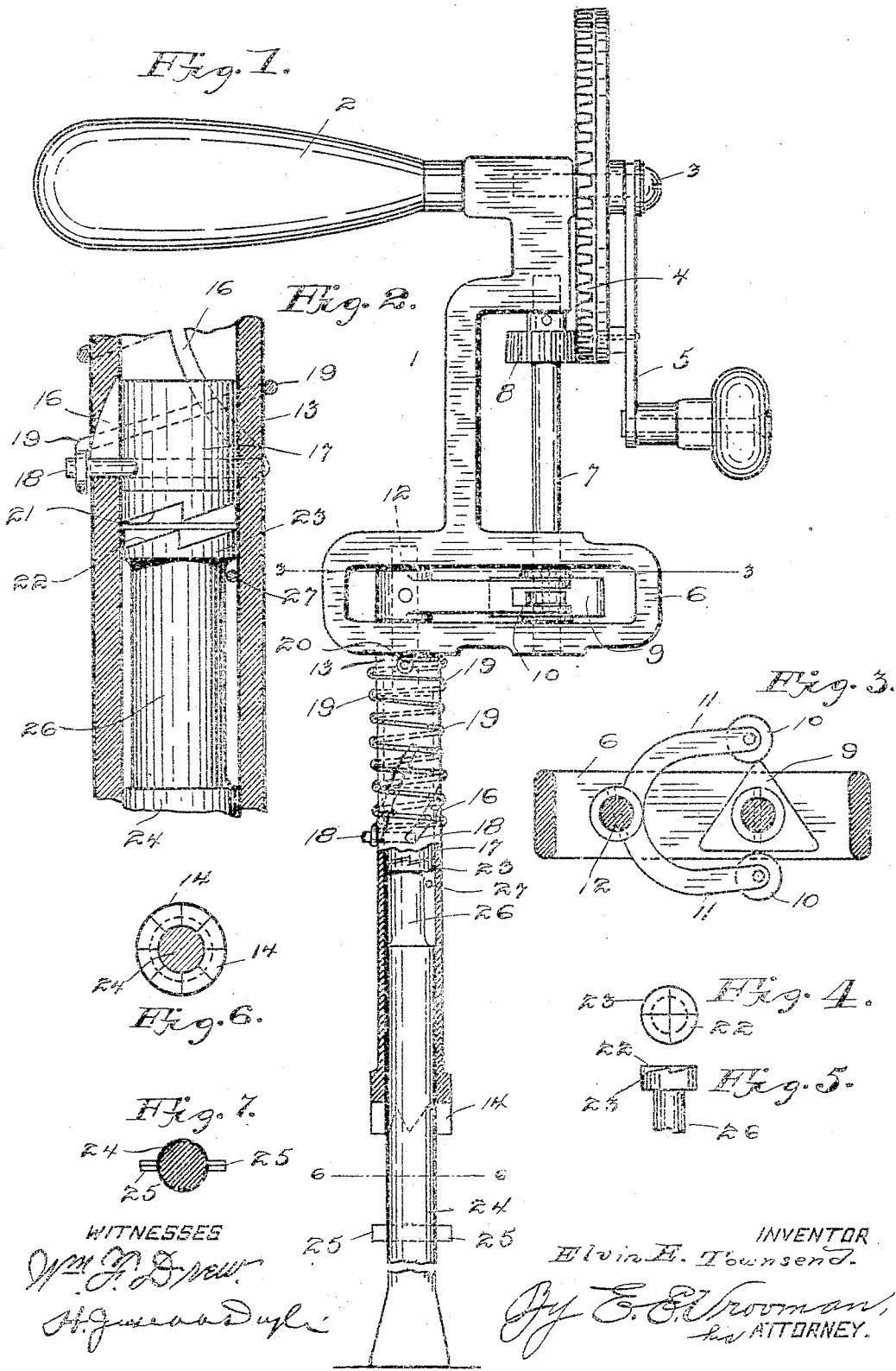

ELVIN E. TOWNSEND, OF OAKLAND, CALIFORNIA.

VALVE-SEAT GRINDER.

959,653. Specification of Letters Patent. Patented May 31, 1910.

Application filed April 17, 1909. Serial No. 490,463.

*To all whom it may concern:*

Be it known that I, ELVIN E. TOWNSEND, a citizen of the United States, residing at Oakland, in the county of Alameda and State of California, have invented certain new and useful Improvements in Valve-Seat Grinders, of which the following is a specification, reference being had therein to the accompanying drawing.

This invention relates to valve seat grinders, and has particularly in view a manually operable tool adapted to oscillate and rotate a valve while in contact with its seat, and thereby assure of the same being acted upon so as to be thoroughly ground.

In carrying out the objects of the invention generally stated above it is contemplated employing a manually operable tool which may be oscillated at a high speed while connected with a valve to impart its movements to the latter, said tool being provided with means whereby a partial rotation of the same may be had by releasing the manually applied pressure upon it so that the oscillating movements may be used to grind the faces of a valve and seat.

It will be understood, of course, that the essential features of the invention involved in producing the invention which is capable of performing the above generally stated functions are necessarily susceptible to a wide range of details and structural arrangements, but one preferred and practical embodiment thereof is shown in the accompanying drawings, wherein—

Figure 1 is a side elevation of the improved seat grinder, a portion thereof being shown in section. Fig. 2 is a detail vertical sectional view of a portion of the tool, showing the clutch connection between the tool and an insertible bit or the like. Fig. 3 is a horizontal sectional view taken on the line 3—3, Fig. 1. Figs. 4 and 5 are respectively, a plan and a side view of the head of the insertible bit. Fig. 6 is a sectional view taken on the line 6—6, looking up. Fig. 7 is a similar view, looking downward.

Referring to said drawings by numerals, 1 designates a frame which at its upper portion is provided with a handle 2, and an oppositely disposed horizontally arranged shaft 3 upon which a gear wheel 4 is mounted. Said shaft 3 is provided with a crank handle 5 by means of which the same is rotated to impart a corresponding movement to the gear wheel 4. The base of said frame is provided with a loop-shaped casing 6 through which a vertically disposed shaft 7 projects, said shaft 7 having one of its ends journaled in said casing and its other end journaled in the upper portion of the frame 1. A pinion 8 is keyed or otherwise rigidly secured to said shaft 7 and is at all times in mesh with the gear wheel 4. The portion of said shaft 7 within the casing 6 has a triangular shaped vibrator 9 fast thereon, the points of which are adapted to contact with the end rollers 10 carried by the yoke arms 11 which are disposed on opposite sides of said vibrator, said arms being rigidly connected with a stub shaft 12 mounted in said casing 6 and having one end projecting into a tubular barrel 13 carried by said casing and being keyed or otherwise rigidly secured to one end of the same. The free end of said barrel 13 is provided with beveled or substantially V-shaped teeth 14 and the intermediate portion of the same is provided with parallel and curved guiding slots 16. A clutch member 17 is slidably mounted in said barrel and is provided with outwardly projecting pins 18 which project through said slots 16. A spring 19 is coiled about said barrel and has one end connected to one of the pins 18 and its other end connected with a pin 20 carried by the upper end portion of said barrel, the tension of said spring being exerted to force said clutch member toward the free end of said barrel. Said clutch member 17 has its outer end provided with beveled and shouldered teeth 21 adapted for an interlocking engagement with similar teeth 22 carried by the head 23 of a bit, screw driver, or the like 24 which is inserted into said barrel. Said bit is provided with oppositely disposed laterally projecting lugs 25 which are acted upon by the end teeth of the barrel 13 to oscillate said bit, as will be presently explained. Said bit adjacent to its head is reduced as indicated at 26 to permit a pin or key 27 to be passed through said barrel to retain the bit therein.

The operation of the device is as follows, assuming the tool to be in the position shown in Fig. 1:—The outer or free end of the bit is inserted in the usual slot in the end of a valve stem, and the handle 5 is operated to rotate its gear wheel 4 and also gear or pinion 8, shaft 7 and vibrator 9, thereby oscillating or vibrating the yoke arms 11 which movement is communicated to shaft 12 and barrel 13. The clutch member 17 being held to the lower ends of the slots of the barrel 13 by the tension of the spring, said member will rotate with the barrel and as its head is in engagement with the toothed head of the bit, the same movement will be imparted to the bit, and through the latter to the valve. During this oscillatory movement of the valve, it is of course advisable to rotate the same occasionally in order to grind evenly, and such rotation may be imparted by releasing the pressure upon the handle 2 which forces the bit down the barrel 13 and at the same time the slots 16 impart a rotary movement to the clutch member 17, thereby rotating the said bit. Thus it will be seen that when pressure is removed from the handle 1, the spring 19 will force the clutch member 17 against the toothed head of the bit and cause said bit to describe a quarter turn as it issues from the barrel 13. To prevent the bit from falling or dropping from the barrel, the pin or key 27 is employed which engages under the head of the bit, as will be readily understood.

From the foregoing it will be seen that the improved tool may be readily operated by one person, and through the described gearing and clutch connections, it is possible to both oscillate and rotate the valve so as to assure of the seat being thoroughly treated or ground at all points.

What I claim as my invention is:—

1. A device of the character described comprising a frame, a barrel carried by said frame, a bit insertible in said barrel and adapted for attachment with a valve, a vibrator carried by said frame for oscillating said barrel and said bit, and means carried by said barrel for imparting a partial rotation to said bit while being vibrated.

2. A device of the character described comprising a frame, a vibrator rotatably mounted therein, a barrel carried by said frame, yoke arms carried by said barrel and held in the path of movement of said vibrator, said barrel being provided with guiding slots, a clutch member mounted in said barrel and having pins projecting through the slots therein, a spring coiled about said barrel and bearing upon one of said pins, and a bit insertible in said barrel and provided with a clutch head which is engaged by said clutch member.

3. A device of the character described comprising a frame, a vibrator mounted therein, means for rotating said vibrator, a barrel carried by said frame, yoke arms carried by said barrel, and held in the path of movement of said vibrator, a clutch member in said barrel, a bit insertible in said barrel and adapted for engagement by said clutch member, and means carried by said barrel for imparting a partial rotation to said clutch member.

4. A device of the character described comprising a frame provided with a handle, a rotatable vibrator mounted in said frame, a barrel carried by said frame and operated by said vibrator, said barrel being provided with guiding slots, a bit adapted to be inserted in said barrel and provided with a toothed head, a clutch member slidable in said barrel and provided with outstanding pins which project through the slots of the barrel, and a spring coiled about said barrel and having one end secured thereto and its other end secured to one of the pins of the clutch member, whereby when a downward pressure is exerted upon said handle, a partial rotation may be imparted to the bit.

5. A device of the character described comprising a frame, a handle therefor, a gear wheel carried by said frame, a vertically disposed shaft mounted in said frame and provided with a pinion held in mesh with said gear wheel, a vibrator carried by said shaft, a barrel carried by said frame and operated by said vibrator, and a bit carried by said barrel.

6. A device of the character described comprising a frame having an operating handle, a horizontally disposed shaft carried thereby, a gear on said shaft, a handle for operating said shaft, a vertically disposed shaft also carried by said frame, a pinion on said vertical shaft and held in mesh with said gear wheel, a vibrator carried by the last mentioned shaft, and a bit-receiving barrel carried by said frame and operated by said vibrator.

In testimony whereof I hereunto affix my signature in presence of two witnesses.

ELVIN E. TOWNSEND.

Witnesses:
F. P. SCHROEDER,
H. C. SCHROEDER.